United States Patent [19]

Siligoni et al.

[11] Patent Number: 4,720,852
[45] Date of Patent: * Jan. 19, 1988

[54] MONOLITHICALLY INTEGRATABLE TELEPHONE CIRCUIT FOR GENERATING CONTROL SIGNALS FOR DISPLAYING THE TELEPHONE CHARGES TO A SUBSCRIBER

[75] Inventors: Marco Siligoni; Mauro Pasetti, both of Milan, Italy

[73] Assignee: SGS Microelettronica SpA, Agrate Brianza, Italy

[*] Notice: The portion of the term of this patent subsequent to Jan. 20, 2004 has been disclaimed.

[21] Appl. No.: 746,774

[22] Filed: Jun. 19, 1985

[30] Foreign Application Priority Data

Jun. 22, 1984 [IT] Italy ................................ 21550 A/84

[51] Int. Cl.⁴ .......................................... H04M 15/20
[52] U.S. Cl. .................................................... 379/124
[58] Field of Search ............................ 179/7.1 R, 7 R; 379/130, 131, 132, 124

[56] References Cited

U.S. PATENT DOCUMENTS

| 4,122,308 | 10/1978 | Weinberger et al. | 179/7.1 R |
| 4,264,956 | 4/1981 | Delaney | 179/7.1 R |
| 4,410,765 | 10/1983 | Hestad et al. | 179/7.1 R |

Primary Examiner—James L. Dwyer
Attorney, Agent, or Firm—Wenderoth, Lind & Ponack

[57] ABSTRACT

A telephone circuit which may be monolithically integrated for generating control signals for displaying the telephone charges to a subscriber is coupled to an AC voltage signal generator of having a predetermined amplitude and frequency which are constant over time. The circuit includes a voltage generator for generating signals which are spaced over time and have a trapezoidal pulse waveshape. A multiplier circuit calculates the product of the signals supplied from the two voltage generators and supplies a signal which is sent to the speech circuit of the subscriber's line and is added to the speech signals. The trapezoidal pulse generator has a capacitor which is charged and discharged by a voltage to current converter of a non-linear type which is driven by exchange control components. The voltage across this capacitor forms the trapezoidal signals supplied by the generator. The converter supplies a current which is proportional to the voltage supplied to its input terminals for voltage values lying between two predetermined threshold values which are opposite in sign and have an identical absolute value. For voltage values beyond the threshold values, a constant current is supplied irrespective of input voltage variations.

1 Claim, 3 Drawing Figures

MONOLITHICALLY INTEGRATABLE TELEPHONE CIRCUIT FOR GENERATING CONTROL SIGNALS FOR DISPLAYING THE TELEPHONE CHARGES TO A SUBSCRIBER

BACKGROUND OF THE INVENTION

The present invention relates to telephone circuit for generating signals designed to inform the subscriber of the relative charge of a telephone call in progress, and in particular to telephone circuits, which may be monolithically integrated, and which generate control signals for the display of the charge to the subscriber, and which are designed to form, together with the speech circuit of the subscriber's line, an interface between the subscriber's telephone line and exchange control components at the telephone exchange.

A subscriber's telephone line is supplied by a direct voltage generator, connected in series with other voltage signal generators, for example, speech band voice signals, ringing signals and signals for the subscriber's telephone charge display.

Both the speech circuit and the ringing circuit of the subscriber's telephone set are connected to terminals of the line in parallel with one another, as well as to other devices, both internal to and external to the telephone set, for example, a display for the progressive metering of the charge of the telephone call in question which is calculated by appropriate exchange components.

The subscriber's telephone charge displays are, as mentioned above, driven by the telephone exchange, via the same telephone line using suitable control signals, normally called "charge signals".

These control signals must have a high amplitude with respect to the maximum amplitude of the speech signals, but cannot take the form of signals having a pulse waveshape as in this case the leading and trailing edges of the pulses would cause harmonics likely not only to disturb the line subscriber but also the subscribers of adjacent lines. In practice, use is made of alternating voltage signals, having a duration which is limited over time (approximately 100 msec) and a frequency (12 or 16 KHz) which is considerably greater than the frequency of the telephone speech signals (0.3 to 3.4 KHz), with relatively long signal level attack and decay times.

At present, the "charge signals" are generally formed and supplied directly to the line by exchange components of the electromechanical type comprising a resonant circuit coupled inductively, via a transformer, to the subscriber's telephone line and activated for predetermined time intervals.

The curve of the increase and decrease in the signal level is of the exponential type.

The above solution is therefore comparatively costly and makes it necessary to tune the resonant circuit accurately to the required frequency.

Copending U.S. patent application Ser. No. 731,167, filed May 6, 1985, now U.S. Pat. No. 4,638,122 sets out a solution which is more suited to the requirements of modern telephone systems of electronic type, and discloses a telephone circuit which generates control signals for the subscriber's telephone charge display and is designed to be monolithically integrated and to form, together with the speech circuit of the subscriber's line, an interface between the subscriber's telephone line and control components at the exchange. This telephone circuit is coupled to a generator of AC voltage signals having a predetermined amplitude and frequency which are constant over time, and comprises a generator of voltage signals which are spaced over time and have a trapezoidal pulse waveshape.

A multiplier circuit calculates the product of the signals supplied by the two generators and supplies a signal which is sent to the speech circuit of the subscriber's line and is added to the speech signals.

It also comprises: a circuit means designed to take an image signal of the aggregate signal already adapted to the line; a high-pass filter designed to eliminate the speech signal components of the image signal; a rectifier circuit designed to rectify the filtered signal from the filter and a comparator designed to compare the rectified signal with a reference signal.

If the amplitude of the rectified signal is greater than the amplitude of the reference signal, the comparator generates a signal designed to stop the increase in the level of the trapezoidal pulse signals, thereby regulating their amplitude.

The generator of the trapezoidal pulse signals is constructed using a circuit comprising a capacitor having a first terminal which is connected to ground, or to an equivalent reference potential, and having a second terminal which is coupled to a supply source, having a positive potential with respect to the ground potential, via a first controlled switch and a first constant current generator connected in series.

The second terminal of the capacitor is then coupled to ground or to a negative potential reference with respect to the ground potential via a second switch and a second constant current generator connected in series.

The first and second switches are caused to close by the exchange control components, whilst the first switch is caused to open by the signal generated by the comparator.

The discharge of the capacitor is indicated by suitable circuit means which cause the second switch to open when the voltage across the terminal of the capacitor is zero.

The voltage across the terminals of the capacitor is designed to constitute the signal supplied by the pulse signal generator.

The capacitor also acts as a memory element for keeping the signal level constant when both switches are open.

SUMMARY OF THE INVENTION

The object of the present invention is to provide a telephone circuit for generating control signals for the subscriber's telephone charge display, which may be monolithically integrated, and is designed to form, together with the speech circuit of the subscriber's line, an interface between the subscriber's telephone line and exchange control components, said circuit being economically advantageous with respect to devices known from the prior art.

This object is achieved by the telephone circuit for generating "charge signals" as set out and characterized in the attached claim.

The above-noted object can be achieved by providing a telephone circuit for generating control signals for a subscriber's telephone charge display and forming an interface between a subscriber's telephone line and exchange control components together with a speech circuit of the said subscriber's line, comprising a generator of speech signals which is coupled to a first voltage signal generator which supplies an AC signal having a predetermined frequency and amplitude which are constant over time, said telephone circuit further comprising a second voltage signal generator for supplying signals spaced uniformly over time and having a trapezoidal pulse waveshape, and which is coupled to said exchange control components which determine the initiation of a rising leading edge and a falling trailing edge of said pulse signals, and a multiplier circuit having a gain which varies in a linear manner with a level of said signals generated by said second generator, said multiplier calculating the product over time of signals supplied by said first and second generators and supplying a voltage signal which is added to signals generated by said speech signal generator contained in said speech circuit of said subscriber's line, wherein said second voltage signal generator comprises a voltage to current converter having first and second input terminals and an output terminal, said converter supplying an output current which is proportional to a voltage between said first and second input terminals for values of this voltage lying between two predetermined threshold values which are of opposite sign and have an identical absolute value and for supplying a current which is kept constant for values of this voltage which are beyond said threshold values, wherein said first terminal of said converter is connected to a constant potential reference via a controlled switch and a constant voltage generator connected in parallel, said exchange control components causing said switch to open and close, and wherein a capacitor is provided, said capacitor having a first terminal connected to said second input terminal and said output terminal of said converter and having a second terminal connected to said constant reference potential, the voltage between said two terminals of said capacitor forming said signal supplied by said second signal generator.

BRIEF DESCRIPTION OF THE DRAWINGS

The invention is explained in the following detailed description, given purely by way of non-limiting example, with reference to the attached drawings, in which.

DESCRIPTION OF THE PREFERRED EMBODIMENT

Figure 1:
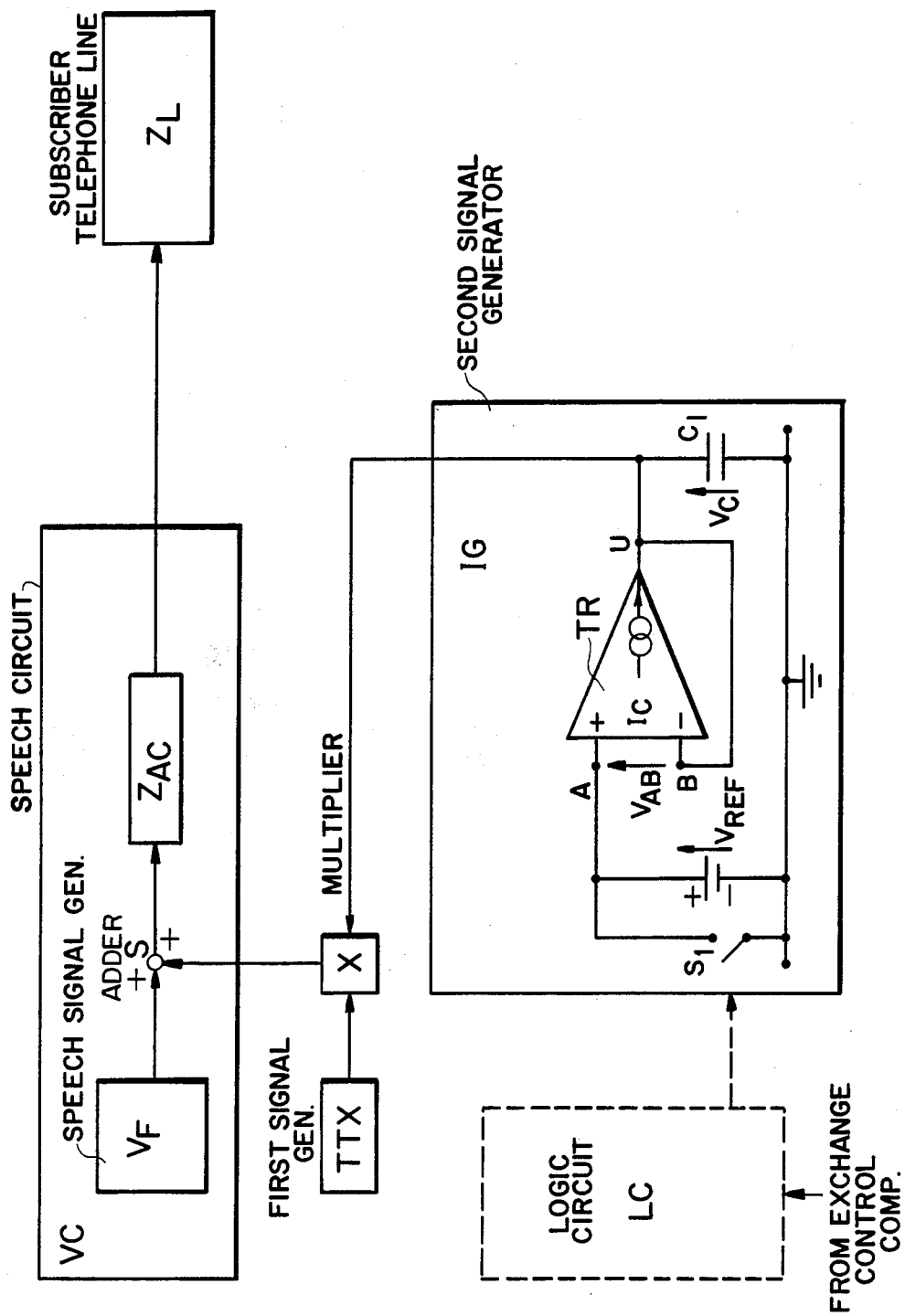
FIG. 1 shows a block diagram of a telephone circuit, which may be monolithically integrated, comprising a generator circuit for "charge signals" in accordance with the present invention.

A telephone circuit for generating "charge signals" in accordance with the present invention is coupled to a first voltage signal generator, shown in FIG. 1 by a block TTX, which is an exchange components and supplies an AC signal having a predetermined amplitude and frequency which are constant over time.

The frequency of this AC signal is selected to be identical to the value required for the "charge signals", i.e. 12 or 16 KHz.

The circuit comprises a second voltage signal generator, shown in FIG. 1 by a block IG, which supplies non-alternating signals, spaced uniformly over time and having a trapezoidal pulse waveshape.

This second signal generator IG is constructed using a circuit comprising, as shown inside block IG itself, a capacitor $C_1$ and a non-linear voltage to current converter TR.

Figure 3:
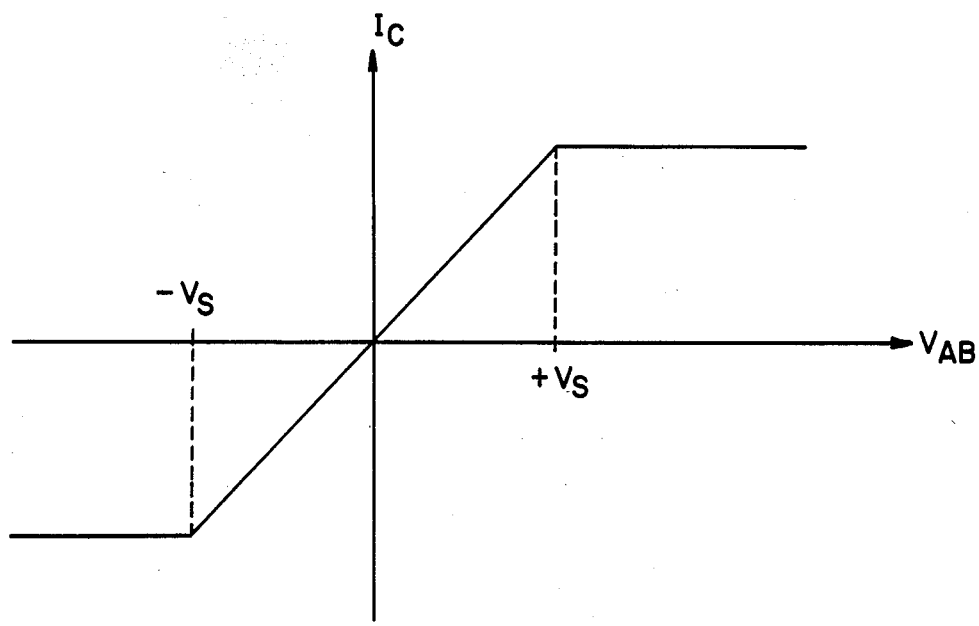
FIG. 3 illustrates the transfer characteristics of the converter of FIG. 2.

FIG. 3 illustrates the relative voltage to current transfer characteristic of the converter TR.

This converter has a first and a second input terminal, shown respectively by A and B, and an output terminal shown by U.

This converter is of the type known to persons skilled in the art by the abbreviation OTA (Operational Transconductance Amplifier) and supplies an output current $I_C$ which is proportional to the voltage $V_{AB}$ between two predetermined threshold values, of opposite sign and having an identical absolute values, $+V_S$ and $-V_S$. Beyond these threshold values, the current $I_C$ supplied by the converter is kept constant irrespective of variations of the voltage $V_{AB}$.

If the voltage $V_{AB}$ has a positive value, the current $I_C$ is supplied in the direction shown by the arrow in FIG. 1, and in the case of negative values of the voltage $V_{AB}$, the current is supplied in the opposite direction.

The first input terminal A of the converter is connected to ground, or to a reference potential equivalent thereto, via a generator of a predetermined constant voltage $V_{REF}$.

The input terminal A is also connected to ground, or to the reference potential equivalent thereto, via a controlled switch $S_1$ which enables terminal A to be short-circuited to ground or to the reference potential.

The second signal generator IG is coupled to the exchange control components, not shown in FIG. 1, by a logic circuit LC, which controls the opening and closing of the switch $S_1$, when appropriate synchronization signals are supplied by the exchange control components. Lo This logic circuit is shown in the FIG. 1 by a block with a dashed outline, showing that it may or may not be included in the actual telephone circuit and that it is not essential for the purposes of the invention. Suffice to said that the switch $S_1$ is controlled by logic circuit LC so as to open and close at the appropriate times. It may consist merely of a switch driver or logic inverter or monostable multivibrator driving a switch driver and would be unnecessary if suitable signals are supplied by the exchange control components.

The second input terminal B and the output terminal U of the converter TR are both connected to a first terminal of the capacitor $C_1$ whose second terminal is connected to ground or to an equivalent reference potential.

The operation of the circuit forming the second generator IG is discussed below.

At the outset, the switch $S_1$ is closed, the capacitor $C_1$ is discharged and both the voltage $V_{AB}$ between the input terminal of the converter TR and the output current $I_C$ are zero.

As soon as the switch $S_1$ is opened, the voltage $V_{AB}$ rises to its maximum value which is equal to the value of the reference voltage $V_{REF}$, since the potential of the terminal B is still equal to the ground potential, as the capacitor $C_1$ is still discharged.

The converter TR then begins to supply an output current $I_C$ whose value is the maximum which may be obtained.

Since the current flow into the input terminal B of the converter is negligible, almost all the current $I_C$ flows into the capacitor $C_1$, generating a voltage $V_c = (I_C/C)t$ at its terminals (wherein C is the capacitance value of the capacitor) which grows in a linear manner over time t so long as the current $I_C$ remains constant, or so long as the value of the voltage $V_{AB}=V_{REF}-V_C$ does not drop below the threshold voltage $+V_S$.

As soon as the value of the voltage $V_{AB}$ drops below the threshold value $+V_S$, the current $I_C$ supplied by the converter begins to decrease, with a value proportional to that of the voltage $V_{AB}$, until this value $V_{AB}$ is zero. The value of the voltage $V_C$ at the terminals of the capacitor $C_1$ is then equal to the value of the reference voltage $V_{REF}$.

The voltage across the terminals of the capacitor $C_1$ has, during charging of the capacitor, a curve which increases in a linear manner in the first instance and then in an exponential manner, until it reaches its maximum value which is equal, as mentioned above, to the value of the reference voltage $V_{REF}$.

The voltage $V_C$ is then constant for the entire time in which the switch $S_1$ is open. If the capacitor $C_1$ began to discharge, the voltage $V_{AB}$ would no longer be zero and the converter would then supply an output current $I_C$ in such a way as to automatically reset the maximum charge level of the capacitor $C_1$. The maximum charge level is determined by the voltage output by the constant voltage generator $V_{REF}$.

As soon as the switch $S_1$ is caused to close, so as to short-circuit the first input terminal A of the converter to ground, a negative voltage $V_{AB}$ is instantaneously supplied across the input terminals A and B. The absolute value of this voltage $V_{AB}$ is equal to that of the reference voltage $V_{REF}$. The converter is therefore still supplying a current $I_C$ whose value is initially the maximum possible and is constant at the outset.

The capacitor $C_1$ is then progressively discharged at the output terminal of the converter with a curve of the voltage $V_C$ at its terminals which in this case decreases in a linear manner over time in the first instance. Then, when the value of the voltage $V_{AB}$ exceeds the threshold value $-V_S$, and therefore the level of the current $I_C$ begins to decrease with a value proportional to the value of the voltage $V_{AB}$, the voltage $V_C$ decreases exponentially over time until the capacitor is completely discharged.

In conclusion, it can be seen that the voltage over time across the terminals of the capacitor $C_1$ has a trapezoidal pulse waveshape, in which the leading edge and the trailing edge of each individual pulse both have a linear section and a exponential connecting section.

The voltage across the terminals of the capacitor $C_1$ forms the voltage signal supplied by the signal generator IG.

A telephone circuit of the invention further comprises a multiplier circuit, shown by a block X, which calculates the product over time of the output signals supplied by the first generator TTX and by the second generator IG. Such a multiplier circuit may be, for example, a Gilbert Multiplier Cell as discussed in Analysis and Design of Analog Integrated Circuits by P. Gray and R. Meyer, Wiley and Sons, published in 1977. It thus provides a voltage signal which is added, in a circuit node S, to the signals generated by a speech signal generator $V_F$, received by the subscriber, contained in the subscriber's line speech circuit with which the circuit generating "charge signals" forms the interface between the exchange control components and the subscriber's telephone line.

The multiplier circuit X is of the type having a gain which varies in a linear manner with the level of one of the two signals for which it calculates the product, in this case with the level of the signal supplied by the second signal generator IG.

The aggregate signal over time supplied by the multiplier circuit is therefore a sequence of alternating signals, having a limited duration and a constant frequency, spaced uniformly over time, whose waveshape, both with respect to its positive and its negative portions, has a trapezoidal envelope, whose leading and trailing edges both have a linear section and an exponential connecting section.

This waveshape is particularly suitable for the control signals of current charge displays.

The subscriber's line speech circuit, shown in FIG. 1 by a block VC, to which the "charge signal" generator circuit is coupled and together with which it may also be monolithically integrated, further comprises circuit means for adapting the speech signals received from the generator $V_F$ to the subscriber's telephone line, shown by a block $Z_L$.

These circuit means, shown by the block $Z_{AC}$ contained in the block VC, are equivalent to an impedance, but may in fact be embodied, as known to person skilled in the art, using complex circuits based on negative feedback techniques.

The summing node S, shown separately from the block $Z_{AC}$ in FIG. 1, may also be part of the complex circuit activating this block $Z_{AC}$ in the practical embodiment of the telephone circuit.

It should also be noted that in certain telephone systems, the line impedance conditions may make it advisable in insert a filter resonant at the frequency of the "charge signals" so as to cancel out at this frequency the output impedance in the line of the "charge signal" generator circuit.

It is therefore obvious that a telephone circuit of the invention is not only advantageous with respect to conventional devices of electromechanical type as it may be monolithically integrated, but is also economically advantageous with respect to the above-described known telephone circuit which may also be monolithically integrated.

This circuit makes the use of smaller integration areas possible since its circuit is less complex and, in particular, there are fewer problems of design both as regards coupling to the exchange control components and coupling to the speech circuit with which the telephone circuit of the invention is integrated.

The overall economic advantageousness of a charging telephone circuit of the invention may make it feasible in some telephone systems to insert this circuit in the subscriber's line even if it is not certain in advance that it will be used.

Figure 2:
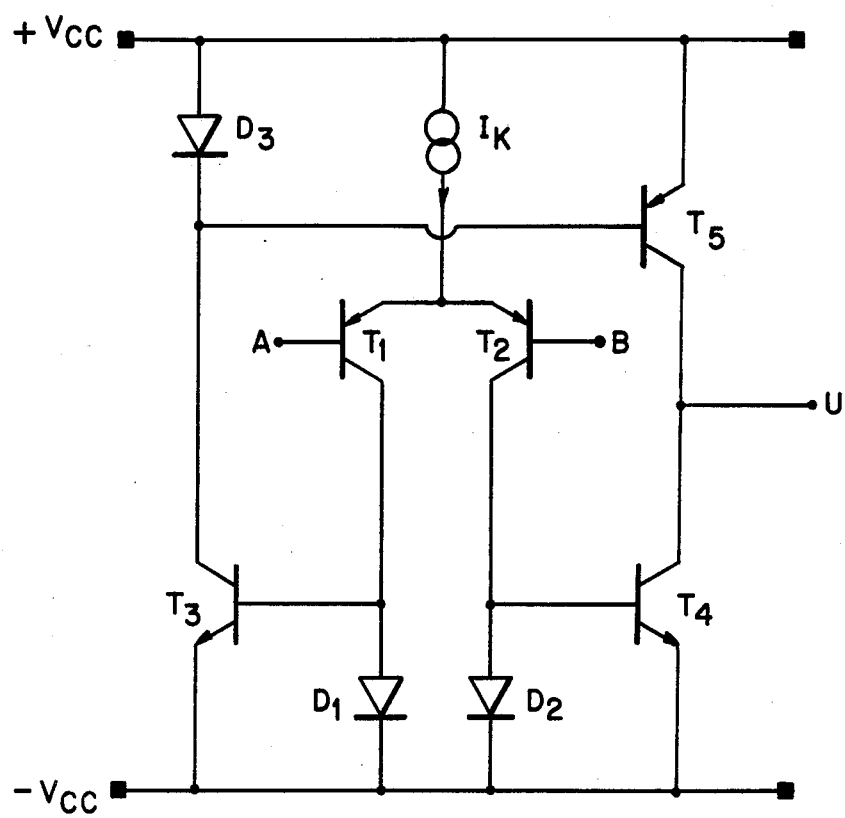
FIG. 2 is a known circuit diagram of a non-linear voltage to current converter, of the type used in a telephone circuit in accordance with the present invention.

The known circuit diagram of a non-linear converter, used to actuate a "charge signal" generator circuit of the invention, is shown in FIG. 2. Its method of operation is known to persons skilled in the art.

It comprises a differential circuit formed by first and second PNP transistors $T_1$ and $T_2$ whose bases form the inputs of this differential circuit.

The base terminals of $T_1$ and $T_2$ respectively form the first and second input terminals A and B of the converter itself.

The emitters of the transistors $T_1$ and $T_2$ are connected to a positive supply voltage source $+V_{CC}$ via a constant current generator $I_K$.

The collector of the transistor $T_1$ is connected to the base of a third NPN transistor $T_3$ and to the anode of a first diode $D_1$.

The emitter of the transistor $T_3$ and the cathode of the diode $D_1$ are connected to a negative supply voltage source $-V_{CC}$.

The collector of the transistor $T_2$ is connected to the base of a fourth NPN transistor $T_4$ and to the anode of a second diode $D_2$.

The emitter of the transistor $T_4$ and the cathode of the diode $D_2$ are connected to $-V_{CC}$.

The collector of the transistor $T_3$ is connected to the cathode of a third diode $D_3$ and to the base of a fifth PNP transistor $T_5$.

The anode of the diode $D_3$ and the emitter of the transistor $T_5$ are connected to $+V_{CC}$.

The collectors of the transistor $T_4$ and $T_5$ are connected together to form the output terminal U of the converter itself.

The operation of this converter circuit is determined by the current generator $I_K$ which sets the maximum absolute value, identical to $I_K$, of the output current which charges or discharges the capacitor, and therefore the curve of the edges of each trapezoidal pulse generated.

The other individual blocks of the diagram of FIG. 1 may be embodied in the conventional circuit forms known to person skilled in the art.

Although a single embodiment of the invention has been described and illustrated, it is obvious that many variants are possible without departing from the scope of the invention.

We claim:

1. A telephone circuit for generating control signals for a subscriber's telephone charge display and forming an interface between a subscriber's telephone line and exchange control components together with a speech circuit of the said subscriber's line, comprising a generator of speech signals which is coupled to a first voltage signal generator which supplies an AC signal having a predetermined frequency and amplitude which are constant over time, said telephone circuit further comprising a second voltage signal generator for supplying signals spaced uniformly over time and having a trapezoidal pulse waveshape, and which is coupled to said exchange control components which determine the initiation of a rising leading edge and a falling trailing edge of said pulse signals, and a multiplier circuit having a gain which varies in a linear manner with a level of said signals generated by said second generator, said multiplier calculating the product over time of signals supplied by said first and second generators and supplying a voltage signal which is added to signals generated by said speech signal generator contained in said speech circuit of said subscriber's line, wherein said second voltage signal generator comprises a voltage to current converter having first and second input terminals and an output terminal, said converter supplying an output current which is proportional to a voltage between said first and second input terminals for values of this voltage lying between two predetermined threshold values which are of opposite sign and have an identical absolute value and for supplying a current which is kept constant for values of this voltage which are beyond said threshold values, wherein said first terminal of said converter is connected to a constant potential reference via a controlled switch and a constant voltage generator connected in parallel, said exchange control components causing said switch to open and close, and wherein a capacitor is provided, said capacitor having a first terminal connected to said second input terminal and said output terminal of said converter and having a second terminal connected to said constant reference potential, the voltage between said two terminals of said capacitor forming said signal supplied by said second signal generator.

* * * * *